10/14/86 RE 32,265

United States Patent [19]

Unger et al.

[11] E Patent Number: Re. 32,265

[45] Reissued Date of Patent: Oct. 14, 1986

[54] HYDROGENATION OF HIGH BOILING HYDROCARBONS

[75] Inventors: Harold Unger, Fort Lee, N.J.; Morgan C. Sze, Portsmouth, N.H.; Roger P. Van Dreisen, Titusville, N.J.

[73] Assignee: Lummus Crest, Inc., Bloomfield, N.J.

[21] Appl. No.: 735,101

[22] Filed: May 17, 1985

Related U.S. Patent Documents

Reissue of:

[64] Patent No.: 4,411,768
Issued: Oct. 25, 1983
Appl. No.: 370,416
Filed: Apr. 21, 1982

U.S. Applications:

[63] Continuation-in-part of Ser. No. 272,720, Jun. 11, 1981, abandoned, which is a continuation of Ser. No. 106,274, Dec. 21, 1979, abandoned.

[51] Int. Cl. ..... C10G 47/26; C10G 47/36

[52] U.S. Cl. ..... 208/59; 208/95; 208/96; 208/99; 208/251 R; 208/108; 208/39; 208/309; 208/48 R

[58] Field of Search ..... 208/95, 96, 99, 59, 208/251 H, 108, 251 R, 255, 309, 39, 48 R

[56] References Cited

U.S. PATENT DOCUMENTS

| | | | |
|---|---|---|---|
| 2,010,007 | 8/1935 | Bray | 208/309 |
| 2,715,603 | 8/1955 | Lanning | 208/96 |
| 3,207,688 | 9/1965 | Van Driesen | 208/59 |
| 3,238,118 | 3/1966 | Arey et al. | 208/59 |
| 3,549,517 | 12/1970 | Lehman et al. | 208/108 |
| 3,788,973 | 1/1974 | Wolk et al. | 208/59 |
| 3,839,187 | 10/1974 | Vanvenrooy | 208/307 X |
| 3,844,933 | 10/1974 | Wolk et al. | 208/59 |
| 4,058,449 | 11/1977 | Reitz et al. | 208/59 |
| 4,151,073 | 4/1979 | Comolli | 208/340 |
| 4,176,048 | 11/1979 | Corns et al. | 208/59 |
| 4,211,634 | 7/1980 | Bertolacini et al. | 208/59 |
| 4,214,976 | 7/1980 | Kmak | 208/48 R |
| 4,252,634 | 1/1981 | Khulbe et al. | 208/48 R |
| 4,255,248 | 3/1981 | Rosenthal et al. | 208/8 LE |
| 4,358,359 | 11/1982 | Rosenthal et al. | 208/10 |
| 4,457,830 | 7/1984 | Kydd | 208/95 |
| 4,537,675 | 8/1985 | Silver et al. | 208/8 LE |

FOREIGN PATENT DOCUMENTS

| | | | |
|---|---|---|---|
| 0480748 | 1/1952 | Canada | 208/309 |
| 2001670 | 2/1979 | United Kingdom | 208/309 |

*Primary Examiner*—John Doll
*Assistant Examiner*—Lance Johnson
*Attorney, Agent, or Firm*—Elliott M. Olstein

[57] ABSTRACT

[In a hydrogenation operation employing an ebullated catalytic bed, recycle is recovered from the hydrogenated product with at least 25%, by volume, of the recycle boiling above 950° F. The recycle is cooled to a temperature of from 350° to 600° F. to separate coke precursors, prior to recycle to the hydrogenation. Higher conversion levels can be achieved by effecting recycle in such manner.] *Disclosed is a hydrogenation process using at least one fluidized catalytic stage and a recycle material of heavy hydrogenated effluent. The heavy effluent material is cooled to a temperature within 350°-600° F. to separate toluene and heptane insoluble coke precursors prior to recycle. This separation may be enhanced by the use of centrifugation, filtration or a bed of particulate material (e.g. calcined coke).*

10 Claims, 1 Drawing Figure

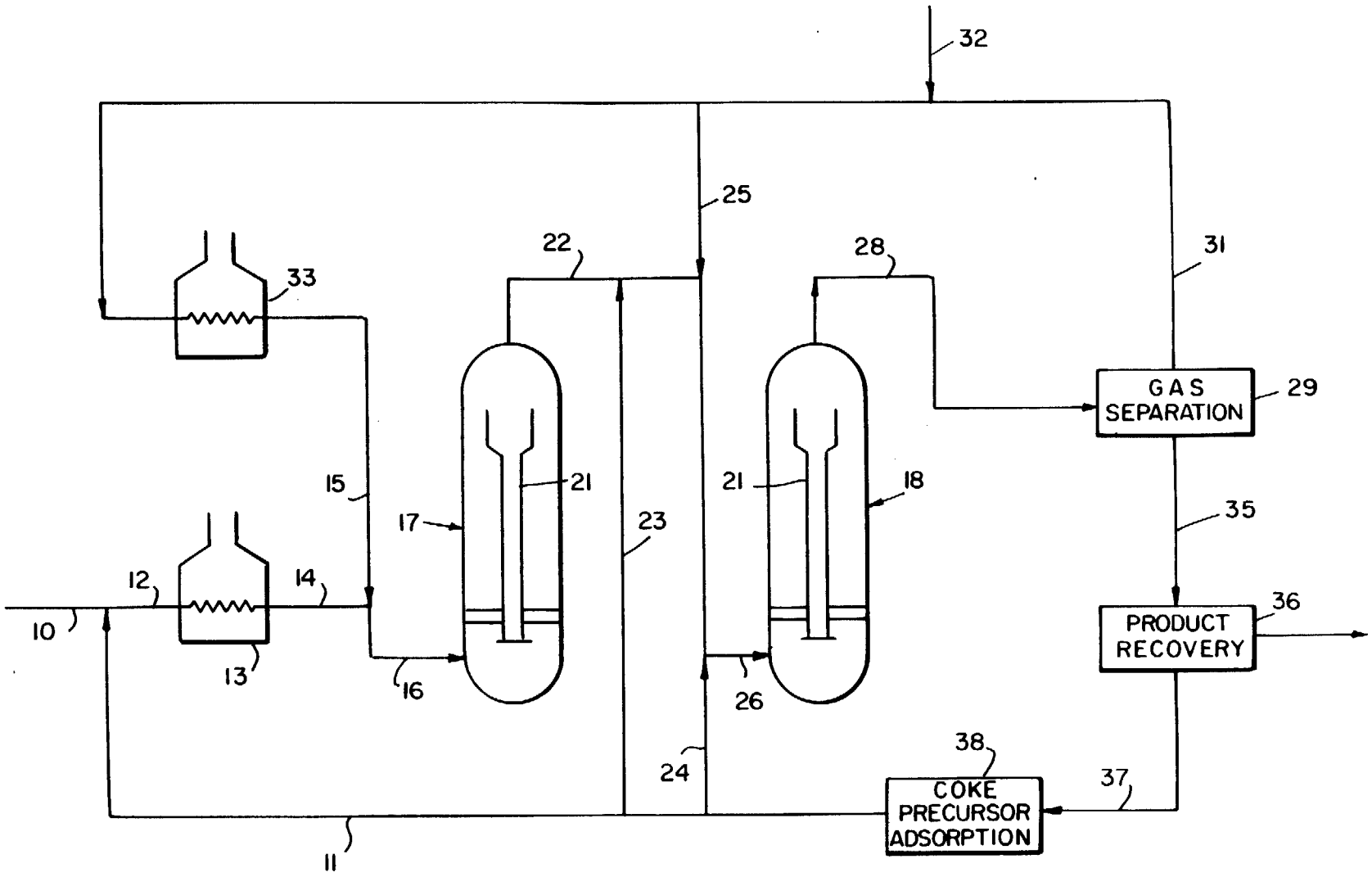
GAS SEPARATION
PRODUCT RECOVERY
COKE PRECURSOR ADSORPTION
10
11
12
13
14
15
16
17
18
21
22
23
24
25
26
28
29
31
32
33
35
36
37
38

HYDROGENATION OF HIGH BOILING HYDROCARBONS

Matter enclosed in heavy brackets [ ] appears in the original patent but forms no part of this reissue specification; matter printed in italics indicates the additions made by reissue.

This application is a *reissue of U.S. Pat. No. 4,411,768, Ser. No. 370,416 which is a* continuation-in-part of U.S. application Ser. No. 272,720, filed on June 11, 1981, now abandoned, with the aforementioned application being a continuation of U.S. application Ser. No. 106,274, filed on Dec. 21, 1979, now abandoned.

This invention relates to hydrogenation, and more particularly to the hydrogenation of high boiling hydrocarbon materials to provide valuable lower boiling materials.

High boiling hydrocarbon materials, derived from either petroleum or coal sources, typically petroleum residuum or solvent refined coal, are hydrogenated in an ebullated (expanded) catalyst bed in order to produce more valuable lower boiling materials. In general, the conversion levels for such an operation are limited by a tendency to form heavy carbonaceous deposits which result in agglomeration of the catalyst. The limit is at a different conversion level for each feedstock.

As a result, there is a need for an improvement in such hydrocarbon processes in order to permit operation at higher conversion levels.

In accordance with the present invention, there is provided an improvement in a process for upgrading high boiling hydrocarbon materials to valuable lower boiling materials in an ebullated catalytic bed, wherein recycle is recovered from the upgraded product and at least 25%, by volume, of the recycle is comprised of the 950° F.+ components of the product. The liquid recycle is cooled to a temperature of at least 350° F. (most generally at least 400° F.) and no greater than 700° F. (most generally no greater than 600° F.) to separate coke precursors from the liquid recycle, prior to introduction thereof into the ebullated catalytic bed of the hydrogenation operation. Applicant has found that by providing recycle in this manner the operability range of the hydrogenation reaction can be extended to operate at higher levels of conversion.

As hereinabove noted, at least 25%, by volume, of the recycle boils above 950° F. In most cases, the 5-volume percent distillation temperature of the recycle is at least 450° F., preferably at least 550° F., and most preferably at least 600° F. The recycle may be conveniently provided by recovering from the product a 550° F.+ fraction. It is to be understood, however, that the recycle could be a higher boiling fraction; for example a 600° F.+ fraction (the 5-volume percent distillation temperature is at least 600° F. and at least 25-volume percent boils above 950° F.), or a 1000° F.° fraction (the 5-volume percent distillation temperature is at least 1000° F.). The recycle is provided as a high boiling recycle in order to minimize the ratio of the 300° F.-550° F. distillate to the 1000° F.+ residue in the liquid phase in the last hydrogenation zone.

In accordance with the present invention, the liquid recycle is treated to remove coke precursors by cooling of the liquid recycle to a preferred temperature of from 350° to 600° F., with such cooling separating coke precursors from the liquid recycle. Coke precursors, which are characterized as being toluene insolubles and heptane insolubles, precipitate from the liquid recycle at such temperatures, and by maintaining the liquid recycle at such temperatures for a sufficient length of time, it is possible to effectively separate and remove such coke precursors from the liquid recycle.

The removal of such coke precursors may be enhanced by a filtration or centrifugation operation; however, it is possible to separate such coke precursors from the liquid recycle without such operation.

It is also possible to enhance the removal of such coke precursors from the liquid recycle at the hereinabove specified temperatures by adding a low boiling liquid to the liquid recycle to reduce the solubility of the coke precursors.

After separating such coke precursors from the liquid recycle, the liquid recycle may be introduced into the ebullated catalytic bed of the hydrogenation reactor, along with the feed thereto, and by separating such coke precursors from the liquid recycle, it is possible to achieve higher conversions, without plugging of the catalyst bed.

In accordance with an embodiment of the invention, the liquid recycle may be cooled to temperatures as hereinabove described, and passed through a bed of particulate material which provides a surface on which the coke precursors may be deposited to thereby facilitate the separation of such coke precursors from the liquid recycle. It is to be understood, however, other surfaces may be used for depositing such coke precursors; accordingly, the scope of the embodiment is not limited to the use of particulate material.

The present invention has particular applicability to a hydrogenation process which is to operate at high conversions; i.e., conversions of greater than 60%, and in particular conversions greater than 70%; however, it is to be understood that the present invention would also be applicable to hydrogenation processes employing an ebullated catalyst bed, which are operated at lower conversions.

The upgrading of the high boiling hydrocarbon materials by hydrogenation in an expanded bed catalytic hydrogenation zone is conducted at temperatures and pressures, and with a catalyst, as generally known in the art; however, by proceeding in accordance with the present invention, it is possible to operate at conversion levels higher than previously employed in the art, without adversely affecting the overall operation. In general, the hydrogenation is conducted at a temperature in the order of from about 650° to about 900° F., preferably from about 750° to about 850° F., and at an operating pressure of from about 500 psig to about 4000 psig, with the hydrogen partial pressure generally being in the order of from about 500 to 3000 psia.

The catalyst which is employed may be any one of a wide variety of catalysts for hydrogenation of heavy materials, and as representative examples of such catalysts, there may be mentioned: cobalt-molybdate, nickel-molybdate, cobalt-nickel-molybdate, tungsten-nickel sulfide, tungsten-sulfide, etc. with such catalyst generally being supported on a suitable support such as alumina or silica-alumina. Such catalyst is maintained in the hydrogenation reactor as an expanded or ebullated bed, as known in the art. In view of the fact that hydrogenation in an ebullated bed is known in the art, no further details in this respect are deemed necessary for a complete understanding of the present invention.

The recycle provided in accordance with the invention is employed in an amount whereby the ratio of recycle to total fresh feed to the hydrogenation is from about 0.2:1 to about 10:1, preferably from about 0.4:1 to about 1.0:1. It is to be understood that each of the hydrogenation zones may or may not include an internal recycle depending on the total flow to the zone. The amount of internal recycle, if any, is adjusted in accordance with the amount of external recycle provided in accordance with the present invention.

The feed to the process, as known in the art, is one which has high boiling components, which are to be converted to more valuable low boiling components. In general, such a hydrocarbon feed has at least 25%, by volume, of material boiling above 950° F. Such feed may be derived from either petroleum and/or coal sources, with the feed generally being a petroleum residuum, such as atmospheric tower bottoms, vacuum tower bottoms, heavy crudes or tars containing small amounts of material boiling below 650° F., or a solvent refined coal, and the like. The selection of a suitable feedstock is deemed to be within the scope of those skilled in the art, and as a result, no further details in this respect are deemed necessary for a complete understanding of the present invention.

The expanded bed catalytic hydrogenation may be accomplished in one, two or more zones, and if there is more than one zone, the recycle, after treatment to remove coke precursors, as hereinabove described, is provided to at least the last of the two hydrogenation zones. The recycle may be provided to the at least last of the two hydrogenation zones. The recycle may be provided to the at least last zone by directly introducing the recycle into the last zone or all or a portion thereof may be introduced into a preceding zone, whereby all or a portion of the recycle to the last zone is provided with the effluent from the preceding zone or zones in the series.

The present invention will be further described with respect to a preferred embodiment thereof illustrated in the accompanying drawing, wherein:

The drawing is a simplified schematic flow diagram of an embodiment of the present invention.

It is to be understood, however, that the scope of the invention is not limited to such preferred embodiment. Thus, for example, although the embodiment is described with respect to the use of two hydrogenation zones, the invention is equally applicable to the use of a single hydrogenation zone, or to the use of more than two hydrogenation zones.

Referring now to the drawing, a hydrocarbon feed to be upgraded, in line 10, is combined with recycle in line 11, if employed as hereinafter described, and the combined stream in line 12 passed through a heater wherein the combined stream is heated to an appropriate hydrogenation inlet temperature, e.g., a temperature in the order of from 600° F. to 800° F. The heated hydrocarbon feed, in line 14, is combined with a gaseous hydrogen containing stream, in line 15, and the combined stream in line 16 introduced into the bottom of the first of two ebullated bed hydrogenation reactors 17 and 18.

The reactors 17 and 18 are of a type known in the art, and may include means 21, in the form of an internal tube, provided with a pump at the bottom thereof, (not shown), for providing internal recycle within the reactor sufficient to maintain the flow for providing an ebullated or expanded catalyst in reactors 17 and 18. If the flow of fresh feed and recycle is sufficient to maintain an expanded catalyst bed, then the internal recycle tube and pump can be eliminated. The reactor 17 is operated at temperatures and pressures as known in the art, and as hereinabove described. Thus, the feed is passed upwardly through reactor 17 in contact with the hydrogenation catalyst therein, and the effluent is withdrawn from reactor 17 through line 22 for introduction into the second hydrogenation reactor 18.

The effluent in line 22 may be combined with recycle, as hereinafter described in more detail, from line 23, in which case the recycle functions to cool the reaction effluent prior to the hydrogen quench. Alternatively, as hereinafter described, the recycle may be provided through line 24, subsequent to hydrogen quenching. The effluent, which may or may not contain recycle, is then quenched with hydrogen containing gas in line 25, and the combined stream in line 26 is then introduced into the bottom of the second ebullated bed hydrogenation reactor 18.

The hydrogenation reactor 18 is operated at conditions as hereinabove described to effect hydrogenation of the feed and upgrading thereof to lower boiling components. As particularly shown, reactor 18 is provided with internal recycle; however as hereinabove described, the internal recycle could be eliminated if the total flow is sufficient to maintain an expanded catalyst bed.

A reaction effluent withdrawn from reactor 18 through line 28 is introduced into a gas separation zone, schematically generally indicated as 29 in order to recover a hydrogen recycle gas from the effluent. The gas separation zone may include one or more gas-liquid separators, and coolers, as appropriate, in order to provide for separation and recovery of the hydrogen recycle gas. Hydrogen recycle gas is recovered through line 31 and after purging, as appropriate, and compression (not shown), and addition of make-up hydrogen through line 32, a portion of the hydrogen is provided to reactor 18 through line 25, and after heating in heater 33 to reactor 17 through line 15.

Liquid product from the gas separation zone 29, in line 35 is introduced into a product separation and recovery zone, schematically generally indicated as 36.

The separation and recovery zone 36 may include one or more fractionating towers, and/or separators, designed and operated to recover various products, and recycle streams, from the hydrogenation effluent. In particular, in accordance with the present invention, there is recovered a liquid recycle stream in line 37, having the characteristics hereinabove described; i.e., a 5-volume percent distillation temperature of at least 450° F. with at least 25 volume percent thereof boiling above 950° F. The recycle is preferably a 550° F.+ or 1000° F.+ fraction recovered from the product.

The recycle in line 37 is introduced into zone 38, wherein the recycle is cooled to a temperature of from 350° F. to 600° F. to separate coke precursors from the liquid recycle. In accordance with a preferred embodiment, the cooled recycle is passed through a bed of particulate material, such as, for example, calcined coke, to deposit the precipitated coke precursors on such solids.

The recycle from zone 38 is then employed in lines 11 and/or 23 and/or 24 in order to provide recycle to the last reactor 18. Thus, all or a portion of the recycle to reactor 18 may be provided directly to reactor 18 or indirectly through reactor 17.

It is to be understood that the hereinabove described embodiment may be modified within the spirit and scope of the present invention. Thus, for example, separation of the coke precursors may be enhanced by providing filtration and/or centrifugation, and/or a low boiling solvent in zone 38.

Thus, in accordance with the present invention external recycle is provided to the last reactor of the series and such recycle is pretreated to remove coke precursors and has boiling characteristics to minimize in the liquid phase of the last reactor the ratio of the 300°-500° F. distillate to the 10,000° F.+ residue.

The present invention will be further described with respect to the following example; however, the scope of the invention is not to be limited thereby:

EXAMPLE

The following is illustrative of conditions for hydrogenation of a reduced crude, employing three expanded bed reactors in series. The catalyst is nickel molybdate supported on alumina.

Operating Conditions of Reactors:

Temperature, °F.—811

Pressure, psig—2250

Liquid Feed, lb./hr.—3.98

Hydrogen Rate, SCFH—59

Conversion of 975° F.+, Vol %—71.6

The recycle is a 550° F.+ fraction recovered from the hydrogenation product, which is contacted with calcined coke (6–20 mesh, bulk density 43 lb/ft3) at a temperature of 550° F. The recycle is then heated to 650° F. and introduced into the second and third reactors, with the ratio of combined recycle to total fresh feed ranging from 2:1 to 10:1.

The present invention is particularly advantageous in that it is possible to extend the range of operable conversion rates for a given feedstock. Thus, by operating in accordance with the invention, a higher rate of conversion may be employed without the difficulties heretofore encountered in the art. Thus, in accordance with the present invention, hydrogenation of heavy hydrocarbon feedstock is effected at higher conversion rates, without an increase in pressure drop, or difficulty in controlling reaction temperatures.

Numerous modifications and variations of the present invention are possible in light of the above teachings and, therefore, within the scope of the appended claims, the invention may be practised otherwise than as particularly described.

We claim:

1. In a process for upgrading high boiling hydrocarbon materials to valuable lower boiling materials [is] *in* a hydrogenation operation including at least one expanded bed catalytic hydrogenation zone to produce an upgraded hydrogenated product, the improvement comprising:

recovering from the upgraded hydrogenation product a recycle liquid having a 5-volume percent distillation temperature of at least 450° F. with at least 25 -volume percent thereof boiling above 950°F.; cooling the liquid recycle to a temperature of at least 350° F. and no greater than 700° F. to [separate] *precipitate coke precursors; removing essentially only* coke precursors from the *cooled* liquid recycle; and subsequent to [separation] *removal* of said coke precursors providing the liquid recycle to an expanded bed catalytic hydrogenation zone.

2. The process of claim 1 wherein the cooled liquid recycle is passed through a bed of particulate solids to deposit separated coke precursors on the solids.

3. The process of claim 2 wherein the recycle liquid is a 600° F.+ fraction.

4. The process of claim 1 wherein the recycle liquid is a 1000° F.+ fraction.

5. The process of claim 1 wherein the recycle is cooled to a temperature of at least 400° F.

6. The process of claim 1 wherein the recycle is cooled to a temperature of no greater than 600° F.

*7. The process of claim 1 wherein the cooled liquid recycle is centrifuged to enhance separation and removal of coke precursors.*

*8. The process of claim 7 wherein the recycle liquid is a 600° F.+ fraction.*

*9. The process of claim 7 wherein the recycle is a 1000° F.+ fraction.*

*10. The process of claim 7 wherein the recycle is cooled to a temperature of no greater than 600° F.*

* * * * *